United States Patent [19]

Carstens

[11] 4,017,039
[45] Apr. 12, 1977

[54] VEHICLE TRANSPORT PIPELINE PUMPING SYSTEM

[75] Inventor: Marion R. Carstens, Atlanta, Ga.

[73] Assignee: Georgia Tech Research Institute, Altanta, Ga.

[22] Filed: Jan. 30, 1975

[21] Appl. No.: 545,339

[52] U.S. Cl. .............................. 243/6; 104/138 R; 104/155

[51] Int. Cl.² .................. B65G 51/04; B61B 13/00

[58] Field of Search ............... 104/23 FS, 134–137, 104/138 R, 138 G, 155; 105/365; 243/2–4, 6, 38; 302/2, 21, 23

[56] References Cited

UNITED STATES PATENTS

| 1,753,987 | 4/1930 | Hohne | 243/6 X |
| 3,438,337 | 4/1969 | Edwards | 104/138 R X |
| 3,469,340 | 9/1969 | Breneman et al. | 104/155 X |
| 3,797,405 | 3/1974 | Carstens et al. | 104/155 |

FOREIGN PATENTS OR APPLICATIONS

| 1,183,443 | 12/1964 | Germany | 243/2 |

Primary Examiner—Evon C. Blunk
Assistant Examiner—Andres Kashnikow
Attorney, Agent, or Firm—Newton, Hopkins & Ormsby

[57] ABSTRACT

Booster pump devices for maintaining air flow through a conduit system for sweeping vehicles along the path defined by the conduit operate in full flow fashion such as tends to create reverse flow of air in the conduit within those sections between the inlet and outlet connections of the pump with the conduit. An overhead suspended air control plate is provided for each section movable incident to vehicle approach from a closed position blocking the section to an upwardly swung open position allowing the vehicle to pass beneath it. The plate is balanced by forces acting upon it to stabilize in the open position until the vehicle passes beyond it whereupon the plate automatically returns to closed position.

31 Claims, 5 Drawing Figures

VEHICLE TRANSPORT PIPELINE PUMPING SYSTEM

BACKGROUND OF THE INVENTION

In transportation systems in which vehicles are swept along within a conduit by a flowing stream of air, the manner in which the air is caused to flow within the system can affect certain characteristics of the system. For example, if the air flow is maintained by a series of spaced apart pumps which each withdraw a fraction of the system air and reintroduce it at locally increased velocity (i.e. as a jet) a continuous movement of the vehicles as they pass these jet pumps can be achieved but the pumping efficiency is relatively restricted. The pumping efficiency can be increased significantly by employing full flow pumps wherein each pump handles the air at a mass rate of flow somewhat in excess of that mass rate of flow at which the air is moving in the system. With a full flow pump system, however, a reverse flow air space is created in the conduit from the point at which air is re-introduced by the pump and to the point at which the air is withdrawn by the pump, creating regions at which the vehicles stop. Because of the intermittent nature of vehicular movements under these conditions, the full flow pump system with its concomitant high pumping efficiency has been considered to be of practical utility only in conjunction with a step-by-step program of vehicle movement through the system. Thus, a vehicle would stop at every pump station, "wait" for the next succeeding vehicle to arrive at that same station, and then be moved on for progression to the next station incident to the arrival of such succeeding vehicle, and so on through the system for as many vehicles as may be involved.

Because of the inherent capability for high pumping efficiency with full flow pump systems it would be desirable to provide such a system which also accommodates for continuous movement of the vehicles, as desired, through the system, i.e. is free from the restraint of step-by-step progression as aforesaid.

BRIEF SUMMARY OF THE INVENTION

It is accordingly an object of this invention to provide vehicle transport system as described generally above, employing the full flow pumping principle yet which allows for unimpeded and interrupted movement of a vehicle, as desired, through the system.

The present system involves an air flow control device associated with a full flow pump station and positioned normally in blocking relation to the conduit so as to prevent reverse air flow between the pump discharge to its inlet but which is moved automatically to unblocking position incident to vehicle approach.

The control device is pivotally suspended at the end of a short passage defined between the inlet and the outlet of the pump and entry of a vehicle into this passage creates an air pressure surge which imparts angular momentum to the device. As the device swings upwardly, aerodynamic lift is imparted to it by reason of its movement into the pump discharge air stream, thus aiding in the opening movement of the device to its unblocking position in which position unimpeded progress of the vehicle beneath and past the control device is possible. The location of the control device, its disposition relative to the pump discharge stream when in unblocking position, the use of counterweighting force, and the effect of the pump discharge air stream acting upon the vehicle after the latter passes beyond the control device all cooperate to effect a smooth, automatic and positive action on the control device.

The control device operating within the system is characterized by having two stable positions, one of which is a closed position and the other of which is an open position. In the closed position, the associated pump acts as a full flow device developing a pressure condition downstream of the control device which keeps it closed. When a vehicle enters the passage blocked by the control device it creates a pressurized cushion of air ahead of it and thereby imparts opening impetus to the control device and it moves into the air stream being discharged by the pump whereby an aerodynamic lift is created on the control device serving to aid the opening action. The control device passes through a partially open but unstable zero-crossing position in which the summation of moments acting upon it is zero and thereafter reaches an open, stable zero-crossing position in which it will clear the vehicle passing beneath it. At this point, the control device causes the pump to act as a jet-type pump discharging the air at high velocity in a generally axial downstream fashion. When the vehicle passes the control device and interacts with this jet stream of air, the stability of the control device at its open position is upset and the control device automatically returns to its closed position.

BRIEF DESCRIPTION OF THE DRAWING FIGURES

DETAILED DESCRIPTION OF THE INVENTION

Figure 1:
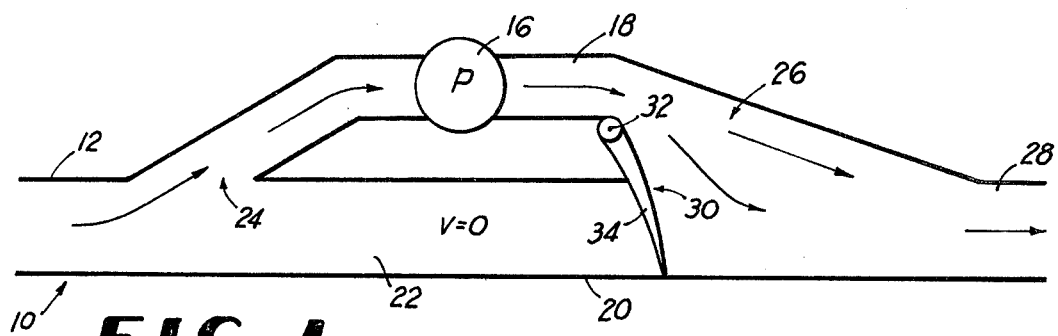
FIG. 1 is a diagrammatic view showing a portion of the system according to the present as illustrating the control device in its closed, stable position.

With reference to FIG. 1, a conduit means is indicated generally by the reference character 10 which generally is in the form of an elongate tube which may be disposed in a closed path along which one or more vehicles are traveled. Details of suitable conduit means are disclosed in my prior applications Ser. No. 193,377 filed Oct. 28, 1971 for "Device to Stop and to Change Directions of Vehicle in Capsule-Transport Pipeline", now U.S. Pat. No. 3,724,691 issued Apr. 3, 1973 and Ser. No. 365,051 filed May 30, 1973 for "Pump for Use in a Capsule Transport-Pipeline", now U.S. Pat. No. 3,881,425, incorporated herein by reference. Generally speaking, however, the conduit 12 proper is of generally uniform cross-sectional shape and of generally constant area which is somewhat larger than the cross-sectional area of the vehicles such as the vehicle 14 shown in FIG. 2 which pass through the conduit means along the path defined thereby.

Also, as is disclosed clearly in the aforesaid applications, the vehicles are blunt at either or both ends so as to provide a high coefficient of drag for the air flowing within the system so that the vehicles are swept along with and by the air stream. Pump means is associated with the conduit means in the form of a series of bypass pumps such as the pump 16 diagrammatically illustrated in FIGS. 1 – 3.

The pump as shown in FIG. 1 operates in a branch 18 parallel with the branch 20 which latter forms a passage 22 forming a part of the path along which the vehicle is traveled. The branch section 20 may be of slightly smaller cross-sectional area than the main conduit sections for a purpose which will be presently apparent.

The point at which the two branches 18 and 20 diverge form an inlet mouth 24 leading to the pump means 16 and the confluence of these branches downstream of the inlet mouth 24 is, as is indicated by the reference character 26, of sufficient area to allow unimpeded flow of the system air as discharged from the pump means 16 to pass into the main conduit section 28 beyond the pump station.

Figure 2:
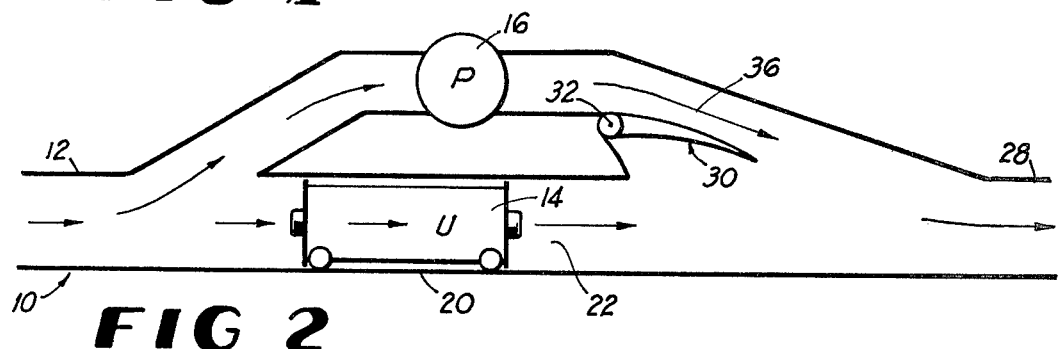
FIG. 2 is a view similar to FIG. 1 but illustrating the manner in which the control device is moved automatically to its upper, stable position.
Figure 3:
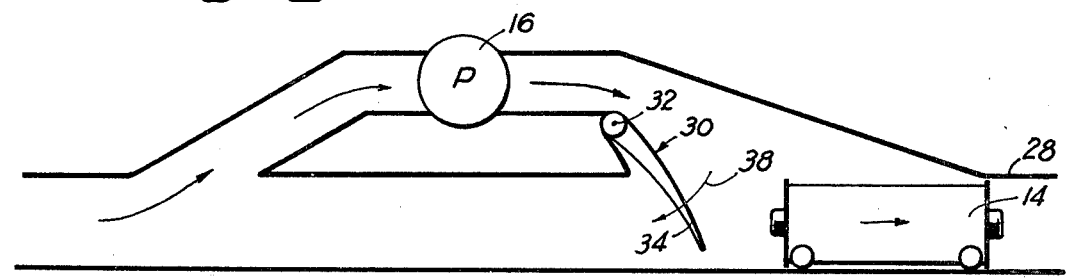
FIG. 3 is a view similar to FIGS. 1 and 2 but showing the vehicle after its passage beyond the control device and illustrating the automatic closing of the control device.

Normally disposed in a closed position in which it blocks the branch section 20 is a control device indicated generally by the reference character 20 and which is pivotally suspended about the horizontal transverse axis 32 so as to hang downwardly in blocking condition with respect to the branch section 20 as is illustrated in FIG. 1. In this blocking position air pressure acting against the downstream side of the plate 54 effects a net moment about the axis 32 tending to maintain the device 30 in the stable, closed position as is illustrated in FIG. 1. Under these conditions, the branch 20 and in particular the passage section 22 defined thereby is in effect a dead air space, the system air in its entirety passing through and being handled by the pump means 16. In this respect, it is to be noted that in accordance with full flow pump principles as disclosed in my aforesaid prior application Ser. No. 365,051 the pump means 16 operates upon the mass rate of air flowing in the system which, in the absence of the closed control device 30, would create a reverse flow of air within the conduit branch section 20 and, under these conditions, the pump is operating under full flow pumping conditions in contrast to the jet-type of pumping condition which can be best explained in conjunction with FIG. 2. In FIG. 2, the control device 30 is shown in its upper, open stable condition which has been attained in the manner presently to be described. With the control device 30 in the position shown in FIG. 2, the discharge stream from the pump means 16 has been restricted such that the discharged air issues as a higher velocity stream than would occur when the pump is operating as in FIG. 1, the increased velocity component being symbolically indicated by the arrow 36. This jet stream of increased velocity is directed essentially axially downstream into the conduit section 28 wherein the velocity component ultimately will be transformed into a pressure component under the equilibrium conditions of the system. After the vehicle 14 has passed beyond the control device 30 as is shown in FIG. 3, and enters the downstream conduit section 28, it achieves the conversion of the velocity component of the jet stream to a corresponding pressure component immediately in the region of the control device 30 which, acting in consonance with a corresponding decrease of aerodynamic lift acting on the control device 30, as hereinafter described, creates the condition whereat the control device automatically closes behind the vehicle 14 as indicated by the arrow 38 in FIG. 3, ultimately to achieve the stable, closed position as illustrated in FIG. 1.

As the vehicle enters the passage 22 when the control device 30 is in the closed position, a pressurized cushion of air is created ahead of it which overcomes the pressure differential normally tending to maintain the control device in the closed position, and imparts an angular momentum to the control device serving to move it in the open direction. As the control device moves into the stream of air being discharged by the pump means 16, an aerodynamic lifting force is created on it and, with relation to this, it is preferred that the control device 30 and more especially the plate 34 thereof be formed of airfoil cross-section so as to enhance the aerodynamic lift effect. If the design conditions are correct, as hereinafter particularly pointed out, the control device will continue in its upward movement until it reaches a stable, open position at which the summation of moments acting upon it is zero, such stable position being illustrated in FIG. 2.

Figure 4:
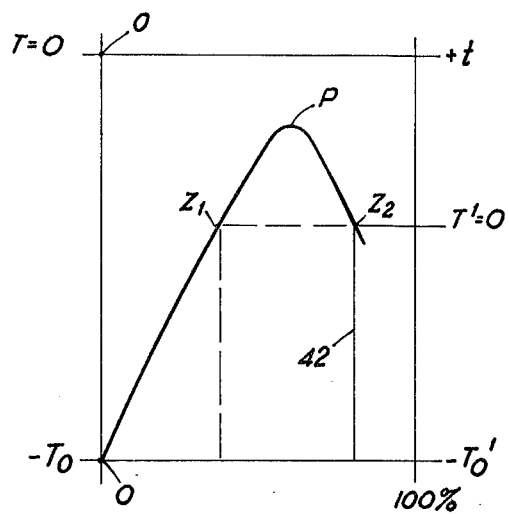
FIG. 4 is a graph illustrating moments acting upon the control device at various positions thereof.

In order to comprehend more fully the conditions which must prevail in order to achieve the stabilized open position of the control device as is illustrated in FIG. 2, reference is had to FIG. 4. In FIG. 4, a simplified curve is shown which is a plot of moments acting upon the control device versus angular disposition of the control device. Thus, the abscissa in FIG. 4 has its origin at the left-hand side at the point at which the control device is fully closed and, at the right-hand extremity there is indicated a 100% angular disposition of the control device which represents the maximum position which it could attain by reason of engaging against the roof of the branch section 18. The open, stable position will be somewhat less of course than this 100% position.

The ordinate at the left-hand side of FIG. 4 indicates a negative torque-$T_0$ acting upon the control device in its closed condition and which is the summation of any gravity component acting upon the control device to close it plus the pressure differential acting across the control device maintaining it in closed condition minus any residual aerodynamic lift which may be acting on the control device. This component is of course reacted by the physical stopping action operating against the control device 30 in its closed condition. The moment-$T_0$, then, is that moment which the pressurized air cushion ahead of the vehicle entering the section 20 must overcome to impart impetus to the control device so as to start it moving in the opening direction.

As the control device opens, the pressure differential across it disappears and the aerodynamic lifting effect progressively increases at least initially but of course the gravity component increases progressively, the summation of which ultimately reaches, for the condition shown, the peak point P which represents a minimum or torque condition tending to close the control device. It should be noted, however, that the fact that the point P for the left-hand ordinate in FIG. 4 represents a minimum torque condition only because the scale of the left-hand ordinate as shown is such that the zero moment point 0 arbitrarily has been chosen to exist in that position shown. Other and different conditions could prevail but ordinarily will not prevail unless some external counteracting moment is applied to the control device such as that illustrated in FIG. 5.

Figure 5:
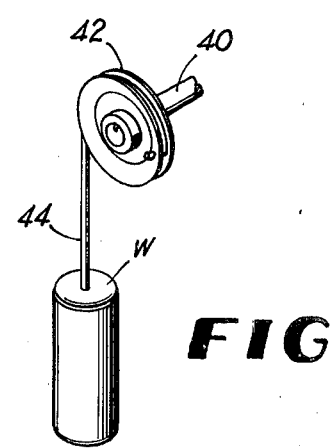
FIG. 5 is a perspective view illustrating one manner of imposing an external moment upon the control device.

In FIG. 5, the shaft 40 which is attached to the control device and forms the pivot axis therefor is shown as having an extension provided, externally of the conduit means with a pulley 42 having a cable 44 wrapped partially therearound and anchored at one end thereto and carrying, at its other end, a counterweight W. Such an arrangement will impose an external counterweighting torque in the direction of opening the control device 30 and, as is shown in the right-hand ordinate of FIG. 4, may be chosen to position the point at which the moment summation is zero such that the curve has two zero crossing points as indicated at $Z_1$ and $Z_2$, respectively. The first zero crossing point $Z_1$ is not a stable condition since any movement of the control device in the direction further to open it will create a positive moment which will continue the opening movement of the control device and conversely, any movement of the control device tending to close it will create a negative moment on the control device tending thereby to continue it in the closing direction. The point $Z_2$, however, is a stable point since just the opposite of the above is true. That is to say, if the control device is moved beyond the stable position as indicated by the line 42 a negative moment is created on it tending to return it to the stable position and, conversely, movement of the control device from the stable point $Z_2$ in the closing direction will impart a positive moment thereon tending to return it to the stable position $Z_2$.

It will be appreciated of course that the linear counterweighting arrangement shown in FIG. 5 and serving to shift the summation of the moments acting on the control device downwardly as is shown by the scale of the right-hand ordinate in FIG. 4 can be replaced by a non-linear arrangement as desired.

The closing condition achieved automatically after the vehicle has passed the control device is a function not only of the conversion of the velocity component of the air stream to a pressure component in the immediate region of the control device 30, but also principally by virtue of the fact that the aerodynamic lifting moment is sharply decreased by virtue of the decreased velocity of the jet stream issuing from the pump means and impinging against the vehicle. The condition which creates the automatic closing once the vehicle has passed the control device and enters the main section 28 of the conduit means is a function then of the velocity and pressure conditions created by the pump means 16, and the air flow through the pump means 16 must be adjusted as by throttling to achieve the requisite action which creates the automatic closing condition.

The control device 30 itself should be of minimal moment of inertia about its pivot axis 32 and, to this end, a hollow structural configuration thereof employing lightweight materials is preferred. For example, an open, aluminum framework covered with snythetic resinous material is particularly suitable for the control device.

What is claimed is:

1. A transportation system comprising, in combination:
    conduit means defining a path for vehicular movement therewithin and having a generally uniform cross-sectional shape of generally constant area;
    a wheeled vehicle in said conduit means having a cross-sectional shape similar to but of smaller area than that of said conduit means, said vehicle presenting a high coefficient of drag with respect to air flowing through said conduit means past said vehicle;
    pump means for creating a flow of air through said conduit means at a selected mass rate of flow sufficient to sweep said vehicle along said path;
    said conduit means including a section having parallel branches, one of which branches defines a passage constituting a portion of said path along which the vehicle moves and the other of which branches defines an air by-pass for said passage, said other branch being overhead with respect to said one branch and joining same at a small angle;
    said pump means including a pump in said by-pass defined by said other branch and operating to divert the full flow of system air around said passage; and
    control means at the confluence of said branches, said control means including a plate pivotally suspended about an axis within said other branch transverse to said passage and normally hanging downwardly to engage the top of said passage at said confluence whereby to block said passage and prevent reverse air flow through said passage.

2. A transportation system comprising, in combination:
    conduit means defining a path for vehicular movement therewithin and having a generally uniform cross-sectional shape of generally constant area;
    a vehicle in said conduit means having a cross-sectional shape similar to but of smaller area than that of said conduit means, said vehicle presenting a high coefficient of drag with respect to air flowing through said conduit means past said vehicle;
    pump means for creating a flow of air through said conduit means at a selected mass rate of flow sufficient to sweep said vehicle along said path;
    said conduit means including a section having parallel branches, one of which branches defines a passage constituting a portion of said path along which the vehicle moves and the other of which branches defines an air by-pass for said passage;
    said pump means including a pump in said by-pass defined by said other branch and operating to divert the full flow of system air around said passage; and
    control means in said passage at the confluence of said branches, said control means including a plate pivotally suspended about an axis transverse to said passage and normally blocking same to prevent reverse air flow through said passage, said plate being of airfoil section to enhance its aerodynamic lift when extended into the discharge stream from said pump.

3. A transportation system as defined in claim 2 wherein said control means includes means for applying a counterbalancing moment on said plate to assure stability of the open position of the plate.

4. A transportation system of the type including a main conduit defining a vehicle travel path and having a vehicle movable therein, and pump means for maintaining a flow of air through said conduit to sweep the vehicle along therein, said pump means including an air by-pass conduit structure diverging from and rejoining said main conduit at longitudinally spaced points to define a main conduit section of finite length and a pump within said by-pass conduit structure operating at sufficient capacity as tends to create a reverse flow of air through said main conduit, the improvement comprising:

a check valve plate pivotally suspended about an axis transverse to said main conduit section and disposed normally to close that end thereof at the region where the by-pass conduit structure rejoins the main conduit, said check valve plate being of a length to swing into the stream of air discharged by said pump and to be aerodynamically influenced by such air stream whereby to assume a stable, upwardly swung position allowing said vehicle to pass beneath it.

5. A transportation system as defined in claim 4 wherein said plate is of airfoil section to enhance its aerodynamic lift when extended into the discharge stream from said pump.

6. A transportation system as defined in claim 5 including means for partially counterbalancing the moment forces acting upon said plate.

7. A transportation system as defined in claim 4 including means for partially counterbalancing the moment forces acting upon said plate.

8. A transportation system as defined in claim 4 wherein said plate when in its stable, open position appreciably restricts the discharge area of the air stream discharged by said pump and directs it substantially axially in said main conduit.

9. A transportation system as defined in claim 8 wherein said plate is of airfoil section to enhance its aerodynamic lift when extended into the discharge stream from said pump.

10. A transportation system as defined in claim 9 including means for partially counterbalancing the moment forces acting upon said plate.

11. A transportation system as defined in claim 8 including means for partially counterbalancing the moment forces acting upon said plate.

12. A transportation system comprising, in combination:

conduit means defining a path for vehicular movement therewithin and having a generally uniform cross-sectional shape of generally constant area;

a wheeled vehicle in said conduit means having a cross-sectional shape similar to but of smaller area than that of said conduit means, said vehicle presenting a high coefficient of drag with respect to air flowing through said conduit means past said vehicle;

pump means for creating a flow of air through said conduit means at a selected mass rate of flow sufficient to sweep said vehicle along said path while tending to create a reverse flow of air in a section of the conduit means;

said section of the conduit means defining a passage along which the vehicle moves and being joined by an overhead inlet branch merging with said passage at a small angle;

said pump means including a pump in said air inlet branch and control means in said passage at the confluence thereof with said air inlet branch, said control means including a plate pivotally suspended about an axis within said overhead inlet branch and transverse to said passage and normally engaging an overhead portion of said passage and blocking same to prevent reverse air flow through said passage.

13. A transportation system of the type including a main conduit defining a vehicle travel path and having a vehicle movable therein, and pump means for maintaining a flow of air through said conduit to sweep the vehicle along therein, said pump means including an air inlet conduit structure joining said main conduit and a pump within said inlet conduit structure operating at sufficient capacity as tends to create a reverse flow of air through a portion of said main conduit, the improvement comprising:

a check valve plate pivotally suspended about an axis transverse to said main conduit and disposed normally to close said main conduit where the inlet conduit structure joins the main conduit, said check valve plate being of a length to swing into the stream of air discharged by said pump and to be aerodynamically influenced by such air stream whereby to assume a stable, upwardly swung position allowing said vehicle to pass beneath it.

14. A transportation system comprising, conduit means defining a path for vehicular movement therewithin and having a generally uniform cross-sectional shape of generally constant area;

a wheeled vehicle in said conduit means having a cross-sectional shape similar to but of smaller area than that of the said conduit, said vehicle presenting a high coefficient of drag with respect to air flowing through said vehicle;

pump means for creating a flow of air through said conduit means for sweeping said vehicle along said path;

said conduit means including a section having parallel branches, one of which branches defines a passage constituting a portion of said path along which the vehicle moves and the other of which branches defines an overhead air passage;

said pump means including a pump connected to said air passage operating at sufficient capacity to tend to create a reverse flow of air through said passage; and a check valve plate positioned to open and close said passage and pivotally suspended within said air passage about an axis transverse to said passage at a point above the path of travel of the vehicle and positioned at the confluence of said branches, said check valve actuated to open and close positions by air pressure.

15. A transportation system of the type including a main conduit defining a vehicle travel path and having a vehicle movable therein, and pump means for maintaining a flow of air through said conduit to sweep the vehicle along therein, said pump means including an air passage conduit structure diverging from and rejoining said main conduit at longitudinally spaced points to define a main conduit section, and a pump connected to said air passage conduit structure operating at sufficient capacity to tend to create a reverse flow of air through said main conduit section, the improvement comprising:

a check valve plate positioned to open and close said main conduit section and pivotally suspended about an axis transverse to said main conduit section at a point within said air passage conduit structure above the path of travel of the vehicle, and disposed in said main conduit section at the region where the air passage conduit structure rejoins the main conduit section, said check valve actuated to open and close positions by air pressure.

16. A transportation system comprising, in combination:
- conduit means defining a path for vehicular movement therewithin and having a generally uniform cross-sectional shape of generally constant area, said conduit means including two branch sections in which one branch section defines a vehicular passage portion of said path for vehicular movement while the other branch section merges overhead and at a small angle with said one branch section downstream of said vehicular passage portion to define an overhead confluence region within said other branch section at the downstream end of said vehicular passage portion;
- pump means in said other branch section for creating a flow of air through said confluence region and into said conduit means downstream of said vehicular passage portion at a selected high mass rate of flow sufficient to sweep said vehicle along said path and which high mass rate of flow tends to create a reverse flow of air through said one branch section;
- a check valve plate pivotally suspended about an axis transverse to said path and within said confluence region, said valve plate being of a length to hang in a normal position which engages and blocks the downstream end of said vehicular passage portion whereby to prevent said reverse flow of air therethrough while also being movable about said axis to an upwardly swung position in which the valve plate is disposed wholly within said confluence region so that a vehicle may pass freely beneath it; and
- said vehicular passage portion being of a length sufficient to create a pressure disturbance therewithin in response to entry of a vehicle thereinto, which pressure disturbance causes said valve plate automatically to move to its upwardly swung position, and said other branch section being so shaped in said confluence region that when said valve plate is in upwardly swung position said valve plate and said other branch section cooperate to cause the flow of air created by said pump means to be converted from said high mass rate flow to a jet flow directed predominantly axially into said conduit means downstream of said confluence region, whereby when a vehicle passes beneath and beyond said valve plate said jet flow impinges thereon to create a pressure disturbance in said confluence region which automatically causes said valve plate to swing downwardly into its normal position.

17. A transportation system as defined in claim 16 wherein said plate is of airfoil section to enhance its aerodynamic lift when extended into the discharge stream from said pump.

18. A transportation system as defined in claim 17 wherein said control means includes means for applying a counterbalancing moment on said plate to assure stability of the open position of the plate.

19. A transportation system as defined in claim 16 wherein said plate when in upwardly swung position appreciably restricts the discharge area of the air stream discharged by said pump means.

20. A transportation system as defined in claim 19 wherein said plate is of airfoil section to enhance its aerodynamic lift when extended into the discharge stream from said pump.

21. A transportation system as defined in claim 20 including means for partially counterbalancing the moment forces acting upon said plate.

22. A transportation system as defined in claim 19 including means for partially counterbalancing the moment forces acting upon said plate.

23. A transportation system comprising, in combination:
- conduit means defining a path for vehicular movement therewith, said conduit means including two branch sections in which one branch section defines a vehicular passage portion of said path for vehicular movement while the other branch section merges overhead and at a small angle with said one branch section downstream of said vehicular passage portion to define an overhead confluence region within said other branch section at the downstream end of said vehicular passage portion;
- pump means in said other branch section for creating a flow of air through said confluence region and into said conduit means downstream of said vehicular passage portion at a selected high mass rate of flow sufficient to sweep said vehicle along said path and which high mass rate of flow tends to create a reverse flow of air through said one branch section; and
- a check valve plate pivotally suspended about an axis transverse to said path and within said confluence region, said valve plate being of a length to hang in a normal position which blocks the downstream end of said vehicular passage portion whereby to prevent said reverse flow of air therethrough while also being movable about said axis to an upwardly swung position in which the valve plate is disposed wholly within said confluence region so that a vehicle may pass freely beneath it and converts said high mass rate flow of air into a jet flow directed predominantly axially into said conduit means beyond said passage portion.

24. A transportation system as defined in claim 23 wherein said plate is substantially parallel to air flow through said confluence region when in said upwardly swung position.

25. A transportation system as defined in claim 24 wherein said plate is of airfoil section to enhance its aerodynamic lift when extended into the discharge stream from said pump.

26. A transportation system as defined in claim 25 including means for partially counterbalancing the moment forces acting upon said plate.

27. A transportation system as defined in claim 24 including means for partially counterbalancing the moment forces acting upon said plate.

28. A transportation system as defined in claim 23 wherein said plate when in upwardly swung position appreciably restricts the discharge area of the air stream discharged by said pump means.

29. A transportation system as defined in claim 28 wherein said plate is of airfoil section to enhance its aerodynamic lift when extended into the discharge stream from said pump.

30. A transportation system as defined in claim 29 including means for partially counterbalancing the moment forces acting upon said plate.

31. A transportation system as defined in claim 28 including means for partially counterbalancing the moment forces acting upon said plate.

* * * * *